US005912878A

United States Patent [19]
Park et al.

[11] Patent Number: 5,912,878
[45] Date of Patent: Jun. 15, 1999

[54] METHOD AND END STATION WITH IMPROVED USER REPONSE TIME IN A MOBILE NETWORK

[75] Inventors: Sung-Woo Park; Dragan Andjelic, both of Vancouver; Viji Maini, Delta, all of Canada

[73] Assignee: Motorola, Inc., Schaumburg, Ill.

[21] Appl. No.: 08/807,509

[22] Filed: Feb. 27, 1997

[51] Int. Cl.[6] .............................. G06F 11/00; H04Q 7/20
[52] U.S. Cl. ........................... 370/229; 370/232; 455/427
[58] Field of Search ..................................... 370/236, 229, 370/232, 349, 331, 469, 412, 235, 468; 455/427, 423, 67.1; 379/58, 60

[56] References Cited

U.S. PATENT DOCUMENTS

| | | | |
|---|---|---|---|
| 5,533,026 | 7/1996 | Ahmadi et al. | 370/349 |
| 5,566,225 | 10/1996 | Haas | 455/423 |
| 5,713,075 | 1/1998 | Threadgill et al. | 455/427 |

OTHER PUBLICATIONS

Caceres, R. and L. Iftode, "Improving the performance of reliable transport protocols in mobile computing environments", IEEE J. on Sel. area in Comm., vol. 13, No. 5, pp. 850–857, Jun. 1995.
Marzoni, P.D. Ghosal, G. Serazzli, "Impact of mobility on TCP/IP: an integrated performance study", IEEE J. on Sel. Areas in Comm., vol. 13, No. 5, pp. 858–867, Jun. 1995.
Park, Sung–Woo, "The Impact of Mobility on TCP/IP", Nov. 21, 1995, pp. 1–20.

*Primary Examiner*—Chi H. Pham
*Assistant Examiner*—Afsar M. Qureshi
*Attorney, Agent, or Firm*—Kenneth A. Haas

[57] ABSTRACT

A method and apparatus of improving user response time during cellular hand-offs and radio frequency changes in a Transmission Control Protocol/Internet Protocol (TCP/IP) mobile environment. In the mobile environment there is at least a mobile end station (20), a mobile data base station (22), a mobile data intermediate system (MDIS) (30) and a fixed end station (40). The MDIS (30) keeps track of the mobile end station (20) as it roams through the mobile environment. As a result, the MDIS (30) can distinguish between delays due to network congestion and delays due to cellular hand-offs. Further, the mobile data base station (22) informs the MDIS (30) of any changes in the radio frequency signal, thus allowing the MDIS (30) to also recognize delays due to changes in the radio frequency signal. With the knowledge of being able to identify the cause of the delays, the MDIS (30) is able to initiate or suppress a congestion control and recovery process.

6 Claims, 3 Drawing Sheets

METHOD AND END STATION WITH IMPROVED USER REPONSE TIME IN A MOBILE NETWORK

FIELD OF THE INVENTION

This invention relates to a method and end station with improved user response time in a mobile network, more specifically, to a method and end station for improving user response time during cellular hand-offs and radio frequency changes in a transmission control protocol/internet protocol mobile environment.

BACKGROUND OF THE INVENTION

Transmission Control Protocol/Internet Protocol (TCP/IP) is a de facto protocol standard that is widely used by a large number of companies and users to connect computers and machines over the Internet. It was developed independent of any specific hardware platform or operating system. It is an open standard that can run over ethernet, token ring or any other underlying network. It also provides a common underlying addressing scheme that assigns each machine or host with a unique address.

One of the characteristics of a TCP protocol that impacts mobility is its ability to handle network congestion. Congestion on the Internet can occur when there is a large load at one or more of the switching centers or routers. The switch or router will then queue the in-coming packets until it can route them. If the congestion becomes severe, the number of packets in the queue will fill up until the queue becomes full. At this point arriving packets will be discarded. The end stations do not know why the packets they sent were lost. The lost packets are timed out and the end station re-transmits the packets. If the re-transmissions were left unchecked, the network becomes so severely congested that the network becomes useless, a condition called "network collapse."

Fortunately, TCP implements an algorithm called "multiplicative decrease" and "slow start" to avoid the congestion problem. Multiplicative decrease congestion avoidance, upon loss of a segment, reduces the congestion window by half from a default size (down to a minimum of at least one segment). For those segments that remain in the allowed window, the re-transmission timer is backed off exponentially. Comer, D. E., *Internet working with TCP/IP, vol. 1, Principle, Protocols and Architectures,* Englewood Cliffs, N.J.: Prentice-Hall, 1991. Because the window size is halved for each packet loss, the window decreases exponentially; the window size drops dramatically in a very short period of time when packets are timed out. As a result, this action relieves the pressure on the congested node.

Once congestion ends and packet acknowledgments (ACKs) are returned, TCP invokes the slow-start recovery. Slow-start (additive) recovery starts the congestion window at the size of a single segment and increases the congestion window by one segment each time an acknowledgment arrives whenever traffic is started on a new connection or traffic is increased after a period of congestion. Id.

This slow start algorithm is used to avoid flooding the network once a congestion condition has been rectified. Flooding the network can quickly cause the network to become congested once again. Each time the transmitter receives an ACK from the receiver, the transmitter increments the window size until the window size reaches half the maximum limit. At this point, TCP slows down the growth of the window by incrementing the window size only when all packets in a given window have been acknowledged. This phase of recovery is called "the congestion avoidance phase."

Reliable transport protocols such as TCP are great for "wired" networks with stationary stations, but have problems when used in a mobile environment.

Therefore, a need exists for a method of implementing reliable transport protocols on a TCP/IP network in a mobile environment. Preferred embodiments of such an invention are described, by way of examples, with reference to the drawings.

BRIEF DESCRIPTION OF THE DRAWINGS

The features of the present invention are set forth with particularity in the appended claims. The invention, together with its preferred embodiments, may be best understood by reference to the accompanying drawings in which:

It will be appreciated that for simplicity and clarity of illustration, elements shown in the figures have not necessarily been drawn to scale. Where considered appropriate, reference numerals have been repeated among the figures to indicate corresponding elements.

DETAILED DESCRIPTION OF THE DRAWINGS

Many vendors already have software developed that operate on top of a TCP/IP stack. Thus, many applications that operate in a wire-line environment can be readily ported to a wireless environment, which is one of the advantages to using TCP/IP in a mobile network. Also, new applications can be readily developed for mobile devices since many people and companies already have the "know-how" to develop applications that work in a TCP/IP environment. They do not have to learn a whole new protocol in order to develop applications.

The TCP is an end-to-end connection-oriented, layer 4 protocol used over the IP. The TCP is an end-to-end protocol in that the communication at this layer is between the source end station and the ultimate destination end station. IP and lower layers are local; they are for forwarding packets to the next end station. The application (also session and presentation) layer is positioned above the TCP layer.

The TCP is connection-oriented meaning that before the source and destination end stations can exchange packet data (packets) using TCP, a "connection" must be established between the two by exchanging establishment packets. Once this establishment has been set up, the source and destination end stations exchange packets with sequence numbers. If one side sends a packet with a certain sequence number and does not receive an acknowledgment within a certain period of time, the packet is re-transmitted by the sender. By using sequence numbers, the source end station can guarantee that a packet has been received by the destination end station.

The ultimate goal of having a mobile TCP/IP network is to allow a mobile end station to move or roam around from place to place and still be able to communicate with other end stations on the Internet. In order to accommodate mobile end stations, the network must be modified or enhanced with the addition of base stations and mobile data intermediate systems (MDIS) as shown in FIG. 1.

Figure 1:
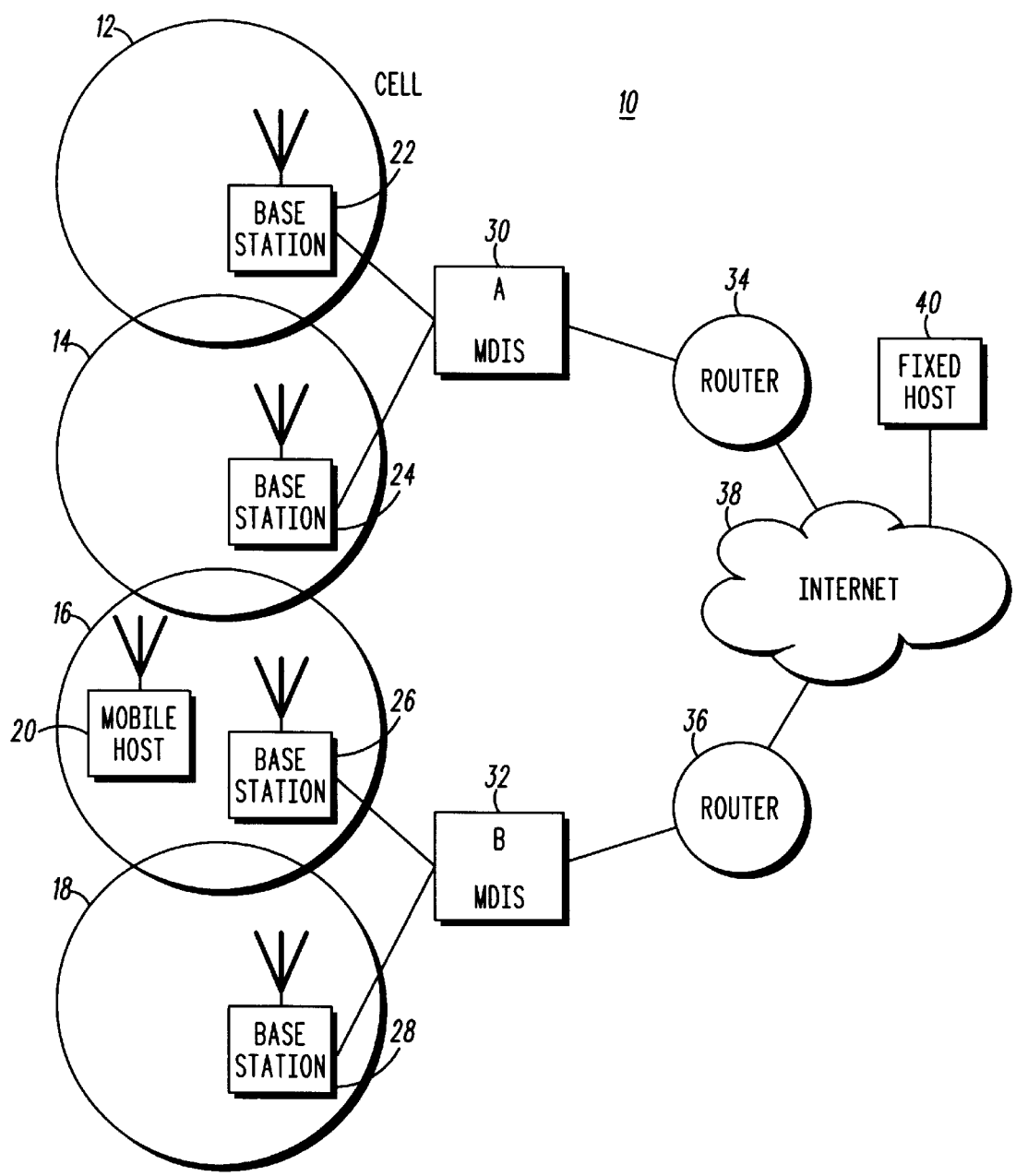
FIG. 1 is an illustration of a basic mobile network in accordance with a preferred embodiment of the invention.

FIG. 1 is an illustration of a basic mobile network 10 in accordance with a preferred embodiment of the invention. In the mobile network 10, geographic areas are divided into cells 12, 14, 16 and 18 with each cell being covered by a base station 22, 24, 26 and 28. A MDIS 30 and 32 is coupled to each cell and is also coupled to an Internet 38 via a router 34 and 36. One of the main functions of the internet protocol is routing. It is at this layer that packets are delivered from a source end station to a destination end station. In the Internet, computers are connected together through routers. Routers or gateways use tables to forward packets from one end station to the next towards the packet's final destination. A mobile end station 20 moves through the plurality of cells 12, 14, 16 and 18 and communicates with a fixed end station 40 via the Internet 38. The mobile end station 20 communicates directly with a base station 22 via a radio frequency link. Base stations are conduits that relay frames between the mobile end station 20 and the MDIS 30. The MDIS 30 relays information between the Internet 38 and the mobile end station 20. The MDIS 30 also keeps track of which mobile end station 20 is registered in its controlling area.

The location of all mobile end stations in a mobile network must be in the MDIS 30, and the MDIS 30 keeping track of a particular mobile end station 20 can be considered that mobile end station's home MDIS. Thus, a mobile end station 20 can roam from a first cell 12 to a second cell 14 and can also roam from the range of a first base station 22 to the range of a second base station 24. Similarly, a mobile end station 20 can roam from the range of a first MDIS 30 to the range of a second MDIS 32. It is up to the home MDIS 30 to keep track of the location of the mobile end station 20 no matter where the mobile end station 20 travels. The mobile network must be able to transfer cellular-based communications, including TCP packets, from a first cell to a second cell as the mobile end station moves through an area. TCP packets are re-transmitted, if at the time of a cellular hand-off, a connection-oriented transport protocol communication is in progress.

Figure 2:
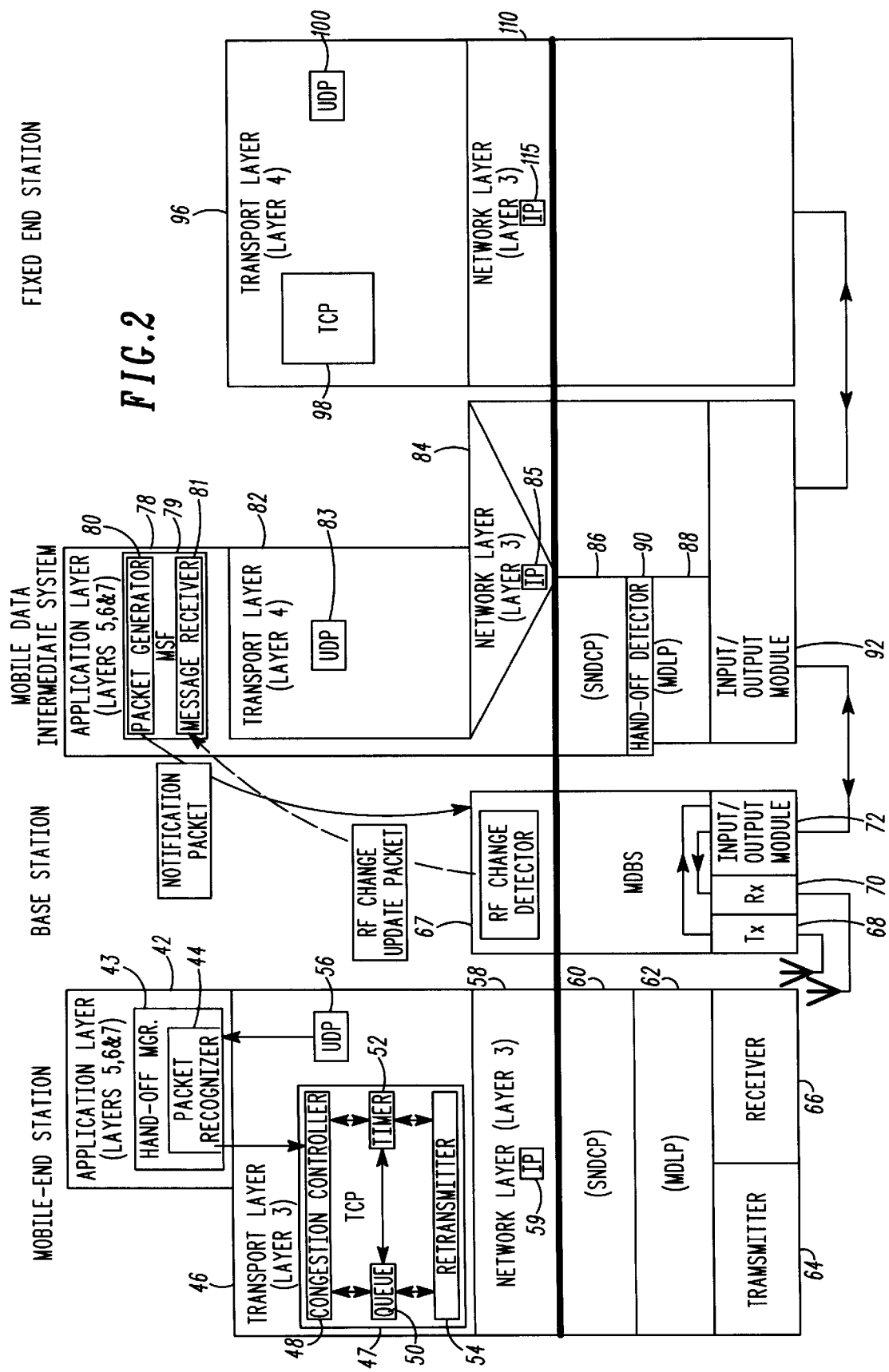
FIG. 2 is an illustration of a protocol stack of the mobile network via which mobile end station—fixed end station communication takes place in accordance with the preferred embodiment of the invention.

FIG. 2 is an illustration of a protocol stack of the mobile network via which mobile end station—fixed end station communication takes place in accordance with the preferred embodiment of the invention. FIG. 2 consist of four different protocol stacks for the following devices: the mobile end station, the base station, the MDIS and the fixed end station. The primary components of the mobile end station are at least the following: A network layer (layer 3) 58 having at least an internet protocol 59. A transport layer (layer 4) 46, positioned above the network layer (layer 3) 58, having at least a TCP 47 and a User Datagram Protocol (UDP) 56, wherein the TCP 47 further comprises at least a congestion controller 48, a queue 50, a timer 52 and a re-transmitter 54. An application layer (layers 5, 6 and 7) 42, positioned above the transport layer (layer 4) 46, having at least a hand-off manager 43 comprising at least a packet recognizer 44. The hand-off manager 43 is coupled to both the TCP 47 and the UDP 56. If the mobile network is a cellular digital packet data (CDPD) system, the mobile end station further comprises at least a sub-network dependent convergence protocol 60, a mobile data link protocol 62, a transmitter 64 and a receiver 66.

The primary components of a base station are at least the following: a mobile data base station 67, a transmitter 68, a receiver 70 and an input-output module 72. The mobile data base station at least comprises a radio frequency change detector.

The primary components of a MDIS are at least the following: A network layer (layer 3) 84 having at least an internet protocol 85. A transport layer (layer 4) 82, positioned above the network layer (layer 3) 84, having at least a UDP 83. An application layer (layers 5, 6 and 7) 78, positioned above the transport layer (layer 4), having at least a message receiver 81 and a packet generator 80. If the mobile network is a CDPD system, the MDIS further comprises at least a subnetwork dependent convergence protocol 86, a mobile data link protocol 88 and an input/output module 92, wherein the mobile data link protocol further comprises at least a hand-off detector 90.

The primary components of a fixed end station are at least the following: A network layer (layer 3) 110 having at least an internet protocol 115. A transport layer (layer 4) 96, positioned above the network layer (layer 3) 110, having at least a TCP 98 and a UDP 100.

A TCP is different from a UDP in that a UDP is a connectionless, best effort protocol. It is much simpler because it does not need to establish a connection before communicating nor does it use sequence numbers. It is a best effort protocol which means that the source end station does not know if the packet it sent reached the destination end station.

The layers listed above reference line 107 are present in TCP/IP systems, whereas the layers listed below reference line 107 are specific for CDPD networks. However, this invention can operate in any TCP/IP based system. FIG. 2 depicts a CDPD system for ease of understanding the invention in relation to a specific mobile network.

The transport layer 46 of the mobile end station invokes a congestion control and recovery process when packets are lost for any reason. In a normal wire-line network (both local area networks and wide area networks), packet losses are usually due to congestion. There are long pauses in communication during cellular hand-offs due to TCP's use of "multiplicative decrease" and "slow start" algorithms. Multiplicative decrease congestion avoidance, upon loss of a segment, reduces the congestion queue 50 by half from a default size (down to a minimum of at least one segment). For those segments that remain in the allowed queue 50, the re-transmitter 54 is backed off exponentially. Each time the mobile end station 20 receives an ACK from the MDIS 30, the transport layer 46 of the mobile end station increments the queue size until the queue size reaches half the maximum limit. At this point, TCP slows down the growth of the queue 50 by incrementing the queue size only when all packets in a given queue have been acknowledged. Because the transport layer 46 cannot distinguish the difference between packet losses due to congestion and packet losses due to cellular hand-offs, the TCP invokes the congestion control and recovery process causing long pauses in communication between the mobile end station 20 and fixed end station 40 during and after a cellular hand-off. Consequently, there is a severe decrease in throughput and end user response time (for inter-active applications). Thus, in such an environment, the TCP's congestion control and recovery process of backing off when it encounters delays in the network degrades the throughput even further.

However, in a mobile network, there is an additional problem of the possibility of losing packets when there is a change in the radio frequency or when the mobile end station 20 either roams from one cell to another cell, roams from one base station to another base station or roams from one MDIS to another MDIS. Regardless of where the mobile end station roams, the mobile end station will change its currently controlling gateway. A currently controlling gateway is the gateway via which the packets are sent to a mobile end station 20. A cellular hand-off or a motion across cell boundaries causes increased delay and packet losses because the network needs to learn the new location of the mobile end station 20. During this time, packets are lost because the mobile end station 20 cannot send packets to the old currently controlling gateway and vice versa.

In a CDPD system, the mobile data link protocol 88 of the MDIS protocol stack detects all cellular hand-offs from the mobile end station 20 via the hand-off detector 90. The cellular hand-offs that are detected by the hand-off detector 90 may be in the form a predetermined mobile-specific event: the mobile end station moving from a first base station to a second base station coupled to a different MDIS or the mobile end station moving from a first base station to a second base station coupled to a common MDIS. Thus, the mobile data link protocol 88 informs the application layer 78 of the MDIS of the occurrence of the predetermined mobile-specific event (e.g., hand-off). Even though only two predetermined mobile-specific events are described in conjunction with the preferred embodiment, it is evident that many alterations, modifications and variations will be apparent to those skilled in the art in light of the foregoing description.

Also, the mobile data base station 67 detects whenever a radio frequency is changed: the mobile end station 20 changing from a first channel to a second channel within a common base station; the mobile end station 20 losing communication with a radio frequency channel; the mobile end station 20 acquiring communication with a radio frequency channel; and the mobile end station 20 changing frequencies within a radio frequency channel or any other alteration, modification and variation in accordance with the scope and spirit of the invention. Thus, the mobile data base station 67 informs the application layer 78 of the MDIS of the occurrence of any change in the radio frequency signal by sending a radio frequency change update packet 74 to the application layer 78 of the MDIS. Thus, the base station 22 and the MDIS 30 are in constant communication with each other. The MDIS 30 may have knowledge of the availability of the radio frequency signals and has authority to determine which radio frequency channel a mobile end station 20 can use.

The application layer 78 of the MDIS protocol stack decides whether to inform the mobile end station 20 of the aforementioned predetermined mobile-specific event or the change in the radio frequency signal at the mobile serving function. If the application layer 78 does decide to inform the mobile end station 20 of the mobile-specific event or the change in the radio frequency signal, the application layer 78 generates a notification packet 76 in the packet generator 80.

The notification packet 76 is sent at least as high as a transport layer in the MDIS. The notification packet is transmitted through at least a transport layer (layer 4) and a network layer (layer 3). The mobile end station 20 receives the notification packet 76 at an application layer 42 of the mobile end station 20 after passing through at least a transport layer (layer 4) and a network layer (layer 3). The notification packet 76 informs the application layer 42 of the mobile end station protocol stack of the mobile-specific event (e.g., hand-off). This process occurs at the middle layers (above the mobile-specific layers) of the mobile end station 20.

Once the application layer 42 of the mobile end station protocol stack receives the notification packet 76 from the application layer 78 of the MDIS protocol stack, the hand-off manager informs the congestion controller 48 that the delay/loss of packets was due to a mobile-specific event (e.g., hand-off) or a radio frequency change and not due to network congestion. Once the transport layer 46 is notified of the mobile-specific event/radio frequency change, the transport layer 46 bypasses TCP's use of "multiplicative decrease" and "slow start" routines which normally occur. The mobile end station 20 in turn sends a notification packet to the fixed end station 40 to inform the fixed end station that the congestion control and recovery process is being bypassed and to initiate fast re-transmission. This method improves network end user response time by up to 400%, increases throughput during mobile-specific events/radio frequency changes and results in less jerkiness in interactive mobile applications.

There are two types of cellular hand-off in a CDPD system. One is an intra-MDIS hand-off where the mobile end station roams between different channel streams within the same MDIS. In this case, the mobile end station keeps the same temporary equipment identifier and sends out a receive ready message to the MDIS when it finishes roaming to the adjacent cell. The other type is an inter-MDIS hand-off where the mobile end station roams to a different base station which is connected to a different MDIS. In this case, the mobile end station must register or re-register on this new MDIS. During an inter- or intra-MDIS hand-off, there may be TCP communication in progress between the mobile end station and the fixed end station. In either case, some packets will either be lost or the delay is so great that the TCP in the mobile end station and the fixed end station will invoke the "multiplicative decrease" algorithm and when communication resumes will invoke the "slow start" algorithm causing further degradation in throughput and user response time.

Figure 3:
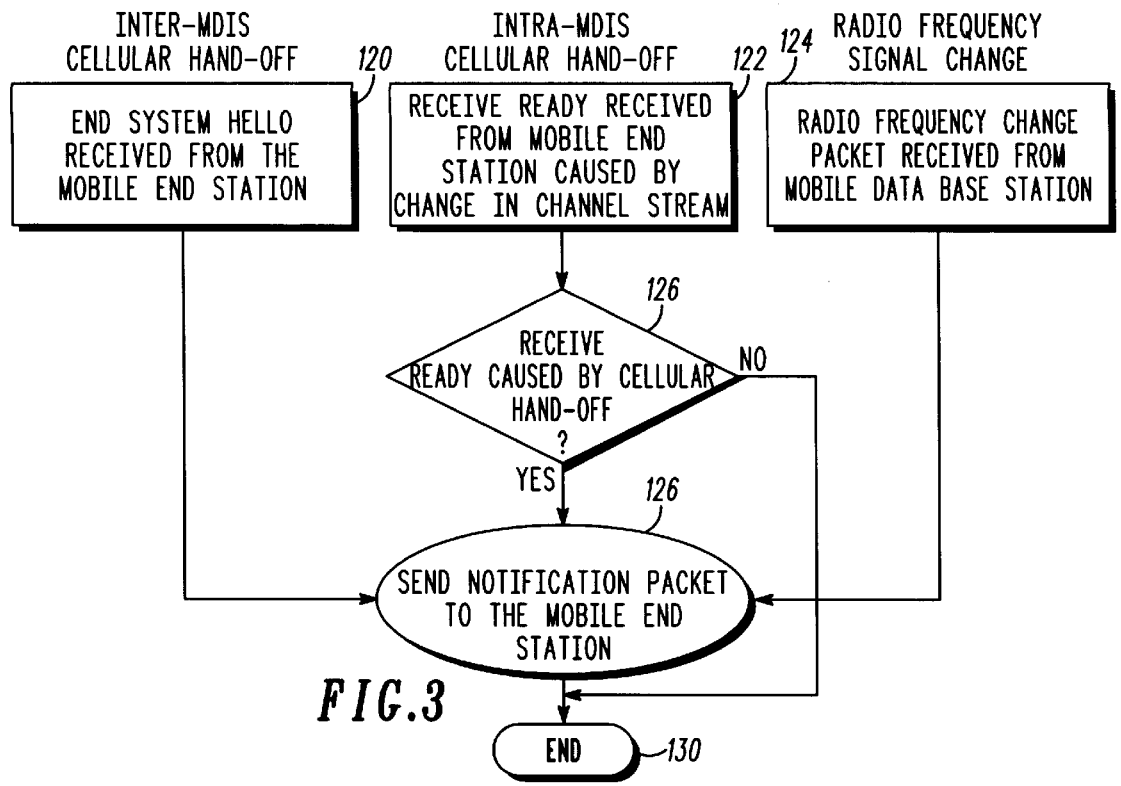
FIG. 3 is a flow diagram of a modification to mobile data intermediate system software in accordance with the preferred embodiment of the invention.

FIG. 3 is a flow diagram of a modification to the MDIS software in accordance with the preferred embodiment of the invention. Thus, FIG. 3 depicts three cases under which notification packets are generated and sent to a mobile end station to prevent the transport layer 46 and 96 on the mobile end station and the fixed end station from invoking the "multiplicative decrease" and "slow start" algorithms. The first case scenario is an inter-MDIS roaming which is detected by the MDIS upon receipt of an end system hello (mobile data link protocol) packet from an mobile end station. When an end system hello packet is received from the mobile end station 20 at step 108, a notification packet 76 is sent from the MDIS 32 to the mobile end station 20 at step 110. The second case scenario is an intra-MDIS roaming where the mobile end station roams from a first base station to a second base station or from a first cell to a second cell all within a common MDIS. In such a case, the mobile end station sends a receive ready message to the MDIS which is caused by a change in channel stream at step 112. If the receive ready message is caused by a cellular hand-off at step 114, the MDIS can determine if the mobile end station has roamed and decide to send the notification packet to the mobile end station to bypass the congestion control and recovery process at step 110. However, if the receive ready message is not caused by a cellular hand-off at step 114, then the congestion control and recovery process will operate as usual. There are cases where the MDIS can receive a receive ready message from a mobile end station but the mobile end station has not roamed at all. The MDIS has an internal table showing the location of each mobile end station. The MDIS can check this internal table to verify that it has changed locations. The third case scenario is when the radio frequency signal used by the mobile end station has changed. Within the cell in which the mobile end station resides, the mobile data base station may change channels or drop and then re-establish the radio frequency link. When this happens, the mobile data base station will notify the MDIS of the radio frequency change by sending a radio frequency change update packet at step 116. Upon receipt of the radio frequency change update packet, the MDIS sends a notification packet to the mobile end station at step 110.

Figure 4:
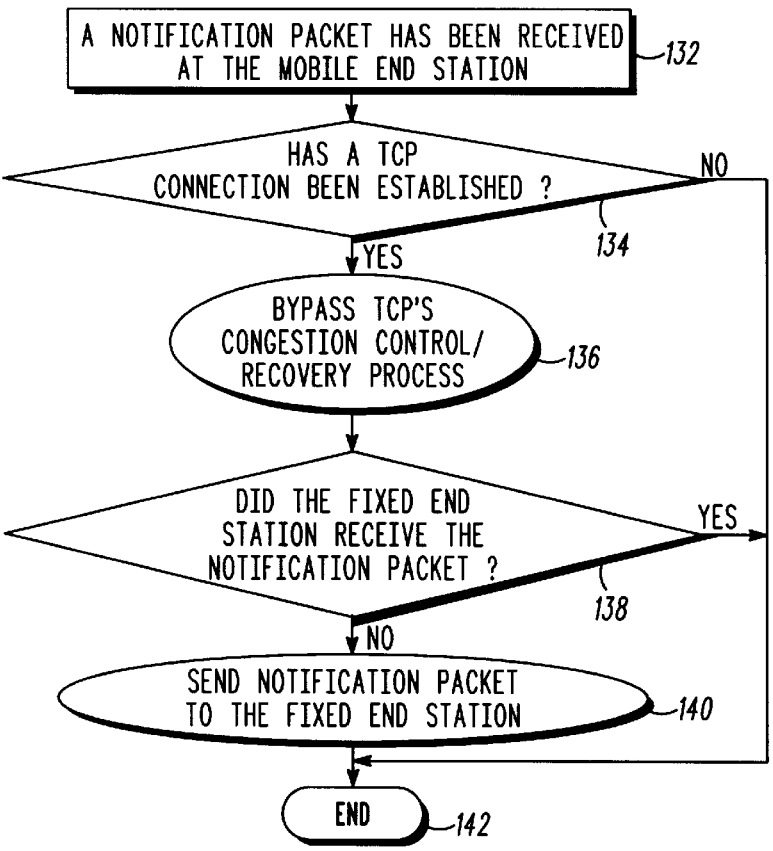
FIG. 4 is a flow diagram of a modification to mobile end station/fixed end station transmission control protocol/internet protocol software in accordance with the preferred embodiment of the invention.

FIG. 4 is a flow diagram of a modification to mobile end station/fixed end station TCP/IP software in accordance with the preferred embodiment of the invention. Thus, FIG. 4 illustrates the routine that the mobile end station and fixed end station use upon receipt of a notification packet. When the notification packet is received by the mobile end station/fixed end station at step 120, step 122 determines whether a TCP has been connected. Thus, the recipient does nothing if a TCP connection has not been established. If the mobile end station and the fixed end station establish a connection at step 122, then the TCP's congestion control and recovery process is bypassed at step 124. If the recipient of the notification packet is the mobile end station at step 126, the mobile end station will send a notification packet to the corresponding fixed end station at step 128. The fixed end station, on the other hand, does not send anything back to the mobile end station since the packet was from the mobile end station itself. This routine avoids an infinite ping-pong situation. Returning back to step 122, if the mobile end station and the fixed end station fail to establish a TCP connection, then the mobile end station and the fixed end station do nothing.

While the invention has been described in conjunction with a specific embodiment thereof, it is evident that many alterations, modifications, and variations will be apparent to those skilled in the art in light of the foregoing description. Thus, it should be understood that the invention is not limited by the foregoing description, but embraces all such alterations, modifications, and variations in accordance with the spirit and scope of the appended claims.

We claim:

1. A mobile data intermediate system (MDIS) comprising:

an input-output module coupled to a mobile end station and coupled to a fixed end station;

a hand-off detector, coupled to the input-output module; and a packet generator coupled to the hand-off detector and coupled to the input-output module, wherein the packet generator transmits from at least a level as high as a transport layer, a notification packet to the mobile end station.

2. The MDIS of claim 1 wherein the hand-off detector detects when a predetermined mobile-specific event occurs.

3. The MDIS of claim 2 wherein the predetermined mobile-specific event is at least one of:

the mobile end station roaming from a first base station to a second base station coupled to a common MDIS; and the mobile end station moving from a first base station to a second base station coupled to a different MDIS.

4. A method comprising the steps of:

at a mobile data intermediate system (MDIS):
identifying at least one of the following events has occurred: a cellular hand-off and a radio frequency signal change;
sending a notification packet from at least as high as a transport layer;

at a mobile end station:
receiving the notification packet at an application layer;
sending the notification packet from the application layer to a transport layer; and
bypassing a congestion control and recovery process in the transport layer.

5. The method of claim 4 wherein the step of identifying that a radio frequency signal change has occurred comprises receiving a radio frequency change update packet from a mobile data base station after the mobile data base station performs the following steps:

monitoring a radio frequency signal being used by the mobile end station; and identifying a change in the radio frequency signal being used by the mobile end station.

6. The method of claim 5 wherein the step of identifying a change in the radio frequency signal being used by the mobile end station at least comprises the mobile end station performing at least one of the following events:

changing from a first channel to a second channel within a common mobile data base station;

losing communication with a radio frequency channel;

acquiring communication with a radio frequency channel; and changing frequencies within a radio frequency channel.

* * * * *